(12) United States Patent
Kim et al.

(10) Patent No.: US 9,699,777 B2
(45) Date of Patent: *Jul. 4, 2017

(54) METHOD FOR TRANSMITTING SIGNAL USING PLURALITY OF ANTENNA PORTS AND TRANSMISSION END APPARATUS FOR SAME

(71) Applicant: LG ELECTRONICS INC., Seoul (KR)

(72) Inventors: Hakseong Kim, Anyang-si (KR); Hanbyul Seo, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/231,672

(22) Filed: Aug. 8, 2016

(65) Prior Publication Data

US 2016/0353419 A1 Dec. 1, 2016

Related U.S. Application Data

(63) Continuation of application No. 14/115,725, filed as application No. PCT/KR2012/003710 on May 11, 2012, now Pat. No. 9,432,170.

(Continued)

(51) Int. Cl.
*H04W 4/00* (2009.01)
*H04W 72/04* (2009.01)
(Continued)

(52) U.S. Cl.
CPC ........ *H04W 72/042* (2013.01); *H04B 7/0413* (2013.01); *H04L 5/0053* (2013.01);
(Continued)

(58) Field of Classification Search
None
See application file for complete search history.

(56) References Cited

U.S. PATENT DOCUMENTS

| | | |
|---|---|---|
| 9,432,170 B2 | 8/2016 | Kim et al. |
| 2007/0117522 A1 | 5/2007 | Axness et al. |

(Continued)

FOREIGN PATENT DOCUMENTS

| | | |
|---|---|---|
| CN | 1713561 | 12/2005 |
| CN | 101868033 | 10/2010 |

(Continued)

OTHER PUBLICATIONS

PCT International Application No. PCT/KR2012/003710, Written Opinion of the International Searching Authority dated Dec. 3, 2012, 15 pages.

(Continued)

*Primary Examiner* — Willie J Daniel, Jr.
(74) *Attorney, Agent, or Firm* — Lee Hong Degerman Kang Waimey

(57) ABSTRACT

The present invention relates to wireless communication, and more particularly, to a method for transmitting a signal using a plurality of antenna ports and a transmission end apparatus for same. According to a method for a transmission end transmitting the signal in a multi-input multi-output (MIMO) wireless communication system of the present invention, a step of transmitting instruction information on a first channel transmission method to a reception end, and a step of transmitting the first channel to the reception end using a resource region are comprised, wherein the first channel is either an advanced-physical downlink control channel (A-PDCCH) or a relay-physical downlink control channel (R-PDCCH), the first channel is not transmitted when at least a portion of the resource region overlaps with a resource region used for transmitting a second channel, (Continued)

and wherein the second channel can be periodically transmitted using a predetermined portion of the resource region.

12 Claims, 8 Drawing Sheets

Related U.S. Application Data

(60) Provisional application No. 61/485,139, filed on May 12, 2011.

(51) Int. Cl.
*H04B 7/0413* (2017.01)
*H04L 5/00* (2006.01)
*H04W 24/02* (2009.01)
*H04W 56/00* (2009.01)

(52) U.S. Cl.
CPC .......... *H04L 5/0058* (2013.01); *H04L 5/0091* (2013.01); *H04W 24/02* (2013.01); *H04W 56/001* (2013.01)

(56) References Cited

U.S. PATENT DOCUMENTS

| 2010/0331029 | A1 | 12/2010 | Linsky et al. |
| 2011/0007673 | A1 | 1/2011 | Ahn et al. |
| 2011/0026458 | A1 | 2/2011 | Gruber et al. |
| 2011/0044391 | A1 | 2/2011 | Ji et al. |
| 2011/0080896 | A1 | 4/2011 | Krishnamurthy et al. |
| 2011/0170496 | A1 | 7/2011 | Fong et al. |
| 2011/0249633 | A1 | 10/2011 | Hong et al. |
| 2013/0077543 | A1 | 3/2013 | Kim et al. |
| 2013/0329686 | A1 | 12/2013 | Kim et al. |
| 2013/0336279 | A1 | 12/2013 | Kim et al. |
| 2014/0050191 | A1 | 2/2014 | Kim et al. |
| 2014/0050192 | A1 | 2/2014 | Kim et al. |
| 2014/0056188 | A1* | 2/2014 | Yang ............. H04L 5/0053 370/280 |
| 2014/0092792 | A1 | 4/2014 | Kim et al. |

FOREIGN PATENT DOCUMENTS

| KR | 10-2010-0109836 | 10/2010 |
| KR | 10-2011-0011508 | 2/2011 |
| KR | 10-2011-0021697 | 3/2011 |
| WO | 2009/022868 | 2/2009 |
| WO | 2010/128816 | 11/2010 |

OTHER PUBLICATIONS

The State Intellectual Property Office of the People's Republic of China Application Serial No. 201280029375.X, Office Action dated Nov. 26, 2015, 8 pages.

Alcatel-Lucent Shanghai Bell, et al., "Discussion on Search Space Design for Non-Interleaved R-PDCCH," 3GPP TSG RAN WG1 Meeting #63, R1-105996, Nov. 2010, 3 pages.

Korean Intellectual Property Office Application Serial No. 10-2013-7029546, Notice of Allowance dated May 19, 2014, 2 pages.

The State Intellectual Property Office of the People's Republic of China Application No. 201280029375.X, Office Action dated May 31, 2016, 16 pages.

\* cited by examiner

FIG. 3
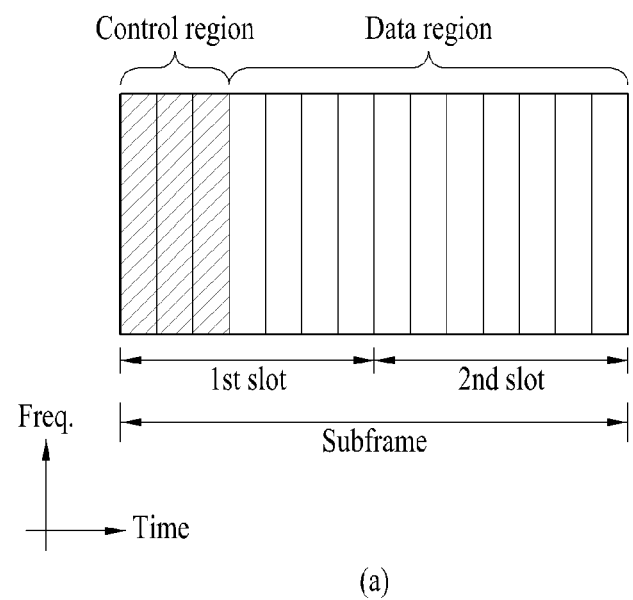
(a)
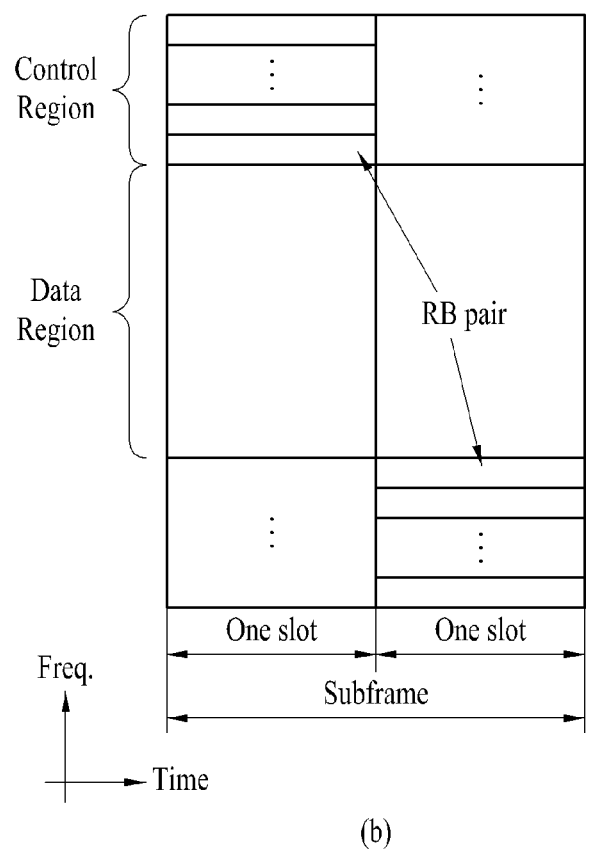
(b)

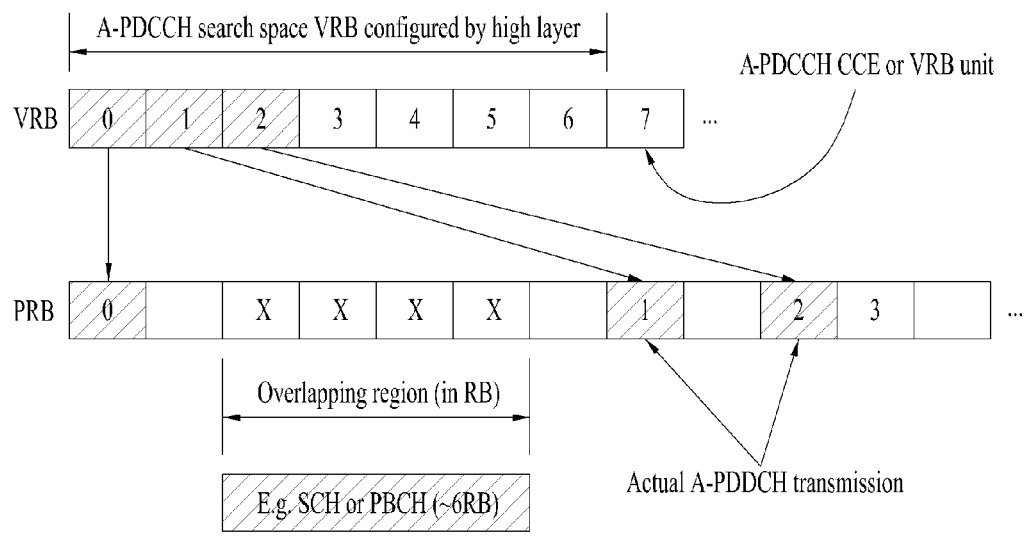
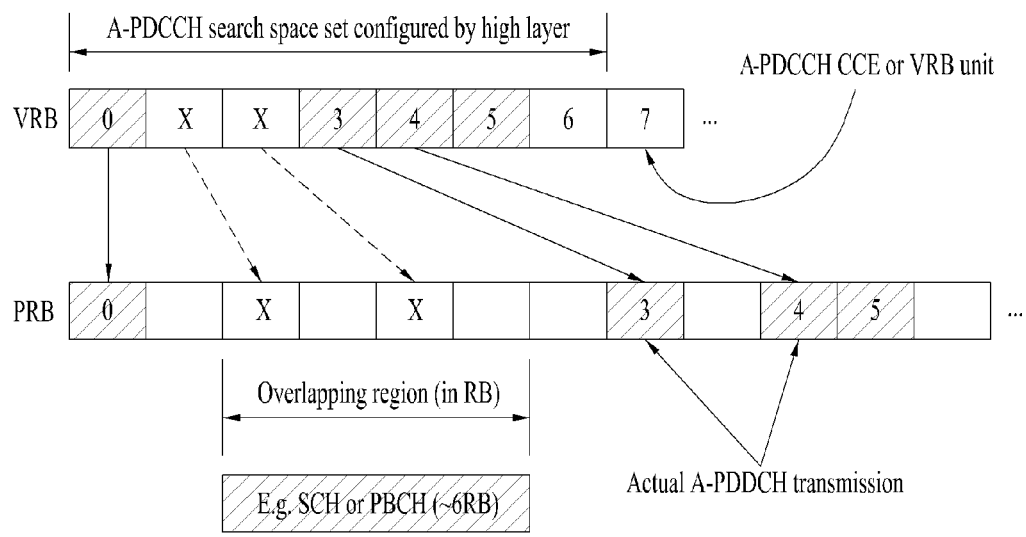

METHOD FOR TRANSMITTING SIGNAL USING PLURALITY OF ANTENNA PORTS AND TRANSMISSION END APPARATUS FOR SAME

CROSS-REFERENCE TO RELATED APPLICATIONS

This application a continuation of U.S. patent application Ser. No. 14/115,725, filed on Nov. 5, 2013, now U.S. Pat. No. 9,432,170, which is the National Stage filing under 35 U.S.C. 371 of International Application No. PCT/KR2012/003710, filed on May 11, 2012, which claims the benefit of U.S. Provisional Application No. 61/485,139, filed on May 12, 2011, the contents of which are hereby incorporated by reference herein in their entirety.

TECHNICAL FIELD

The present invention relates to wireless communication, and more particularly to a method for transmitting a signal using a plurality of antenna ports and a transmission-end apparatus for the method.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE

Technical Problem

An object of the present invention is to provide a method for enabling a transmission end supporting signal transmission through a plurality of antenna ports to transmit a signal using the plurality of antenna ports.

Another object of the present invention is to provide a transmission end for transmitting a signal using a plurality of antenna ports.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for transmitting a signal by a transmitter in a Multiple Input Multiple Output (MIMO) wireless communication system including: transmitting indication information on a transmission scheme of a first channel to a receiver; and transmitting the first channel to the receiver using a resource region, wherein the first channel is an Advanced-Physical Downlink Control Channel (A-PDCCH) or a Relay-Physical Downlink Control Channel (R-PDCCH), and if at least one part of the resource region overlaps a resource region used for transmission of a second channel, the first channel is not transmitted, and the second channel is periodically transmitted using a predetermined part of the resource region.

In accordance with another aspect of the present invention, a method for transmitting a signal by a transmitter in a Multiple Input Multiple Output (MIMO) wireless communication system includes: transmitting indication information on a transmission scheme of a first channel to a receiver; and transmitting the first channel to the receiver using a resource region, wherein the first channel is an Advanced-Physical Downlink Control Channel (A-PDCCH) or a Relay-Physical Downlink Control Channel (R-PDCCH), and if at least one part of the resource region overlaps a resource region used for transmission of a second channel, the first channel is transmitted using the remaining resource regions other than the overlapped at least one part of the resource region, and the second channel is periodically transmitted using a predetermined part of the resource region.

In accordance with another aspect of the present invention, a transmitter for transmitting a signal in a Multiple Input Multiple Output (MIMO) wireless communication system includes: a transmission module configured to transmit indication information on a transmission scheme of a first channel to a receiver, and transmit the first channel to the receiver using a resource region; and a processor, if at least one part of the resource region overlaps a resource region used for transmission of a second channel, configured to prevent a transmission of the first channel, wherein the first channel is an Advanced-Physical Downlink Control Channel (A-PDCCH) or a Relay-Physical Downlink Control Channel (R-PDCCH), and the second channel is periodically transmitted using a predetermined part of the resource region.

In accordance with another aspect of the present invention, a transmitter for transmitting a signal in a Multiple Input Multiple Output (MIMO) wireless communication system includes: a transmission module configured to transmit indication information on a transmission scheme of a first channel to a receiver, and transmit the first channel to the receiver using a resource region; and a processor, if at least one part of the resource region overlaps a resource region used for transmission of a second channel, configured to transmit the first channel using the remaining resource region other than the overlapped at least one part of the resource region, wherein the first channel is an Advanced-Physical Downlink Control Channel (A-PDCCH) or a Relay-Physical Downlink Control Channel (R-PDCCH), and the second channel is periodically transmitted using a predetermined part of the resource region.

Advantageous Effects

As is apparent from the above description, the embodiments of the present invention can enable a reception end to improve a decoding throughput of an A-PDCCH or R-PDCCH, and can enable a transmission end to transmit on a A-PDCCH or R-PDCCH using a spatial multiplexing scheme, resulting in increased efficiency of resource usage.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 3 is an exemplary structural diagram illustrating downlink and uplink subframes for use in a 3GPP LTE system as an exemplary mobile communication system.

FIG. 7 is a conceptual diagram illustrating a method for performing modified VRB-to-PRB mapping considering a plurality of overlapped RBs according to an embodiment.

FIG. 8 is a conceptual diagram illustrating a VRB set configuration considering an overlapping region according to an embodiment.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as a 3GPP LTE or LTE-A system, but the present invention is not limited thereto and the remaining parts of the present invention other than unique characteristics of the 3GPP LTE or LTE-A system are applicable to other mobile communication systems.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts.

In the following description, a terminal may refer to a mobile or fixed user equipment (UE), for example, a user equipment (UE), a mobile station (MS) and the like. Also, the base station (BS) may refer to an arbitrary node of a network end which communicates with the above terminal, and may include an eNode B (eNB), a Node B (Node-B), an access point (AP) and the like. Although the embodiments of the present invention are disclosed on the basis of 3GPP LTE, LTE-A systems for convenience of description, contents of the present invention can also be applied to other communication systems.

In a mobile communication system, the UE may receive information from the base station (BS) via a downlink, and may transmit information via an uplink. The information that is transmitted and received to and from the UE includes data and a variety of control information. A variety of physical channels are used according to categories of transmission (Tx) and reception (Rx) information of the UE.

Figure 1:
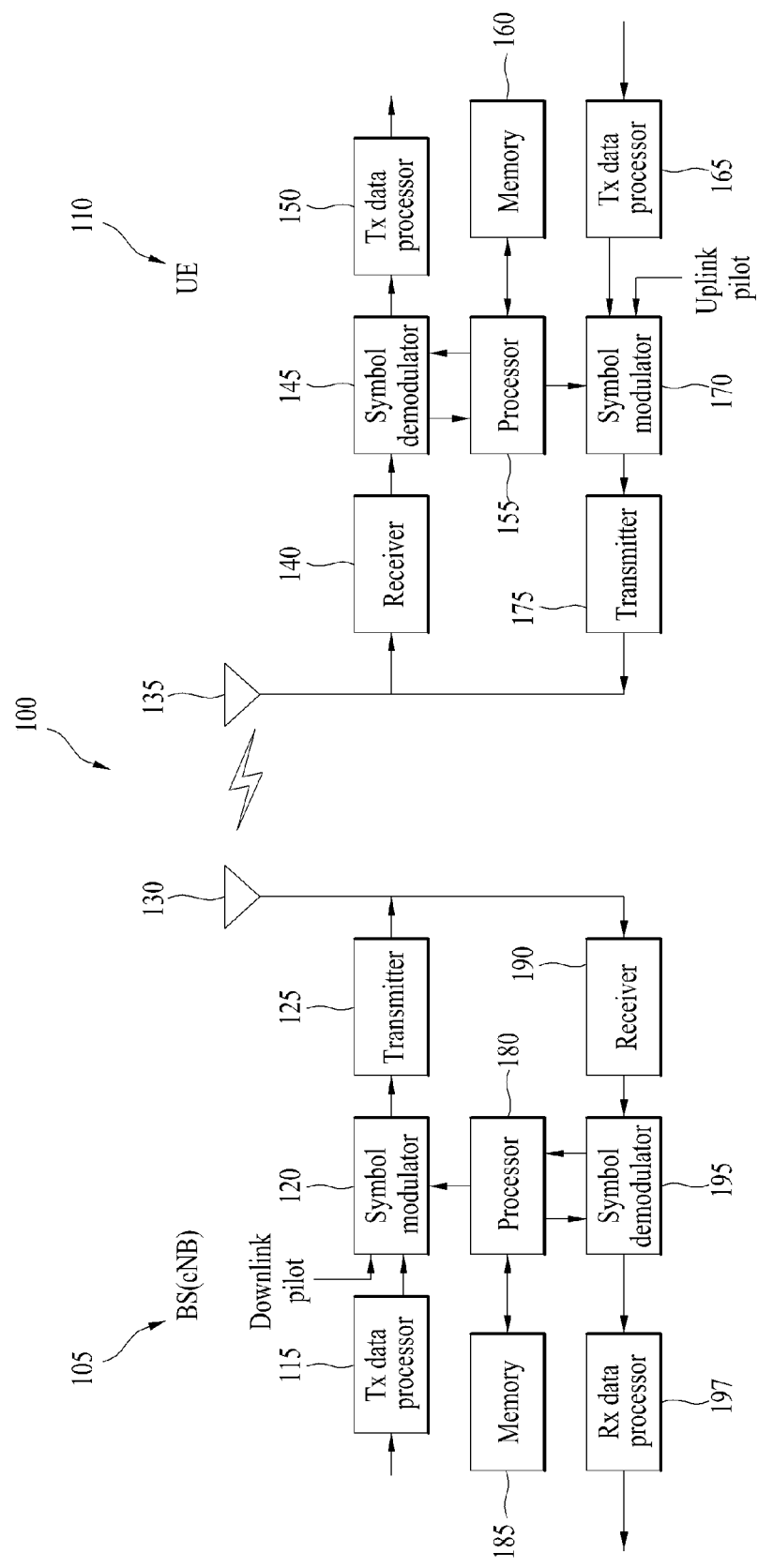
FIG. 1 is a block diagram illustrating a transmission end and a reception end for use in a wireless communication system.

FIG. 1 is a block diagram illustrating a transmission end 105 and a reception end 110 for use in a wireless communication system 100 according to the present invention.

Although FIG. 1 shows one transmission end 105 and one reception end 110 for brief description of the wireless communication system 100, it should be noted that the wireless communication system 100 may further include one or more transmission ends and/or one or more reception ends.

Referring to FIG. 1, the transmission end 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The reception end 110 may include a Tx data processor 165, a symbol modulator 170, a transmitter 175, a transmission/reception antenna 135, a processor 155, a memory 160, a receiver 140, a symbol demodulator 155, and a Rx data processor 150. In FIG. 1, although one antenna 130 is used for the transmission end 105 and one antenna 135 is used for the reception end 110, each of the transmission end 105 and the reception end 110 may also include a plurality of antennas as necessary. Therefore, the transmission end 105 and the reception end 110 according to the present invention support a Multiple Input Multiple Output (MIMO) system. The transmission end 105 according to the present invention can support both a Single User-MIMO (SU-MIMO) scheme and a Multi User-MIMO (MU-MIMO) scheme.

In downlink, the Tx data processor 115 receives traffic data, formats the received traffic data, codes the formatted traffic data, and interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbol.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the RN through the antenna 130. The Tx antenna 130 transmits the generated DL signal to the UE.

Configuration of the reception end 110 will hereinafter be described in detail. The Rx antenna 135 of the reception end 110 receives a DL signal from the transmission end 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the transmission end 105.

The Tx data processor 165 of the reception end 110 processes traffic data in uplink, and provides data symbols. The symbol modulator 170 receives and multiplexes data symbols, and modulates the multiplexed data symbols, such that it can provide a stream of symbols to the transmitter 175. The transmitter 175 receives and processes the stream of symbols to generate an uplink (UL) signal, and the UL signal is transmitted to the transmission end 105 through the Tx antenna 135.

The transmission end 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the reception end 110.

Processor 155 or 180 of the reception end 110 or the transmission end 105 commands or indicates operations of the reception end 110 or the transmission end 105. For example, the processor 155 or 180 of the reception end 110 or the transmission end 105 controls, adjusts, and manages operations of the reception end 110 or the transmission end 105. Each processor 155 or 180 may be connected to a memory unit 160 or 185 for storing program code and data. The memory 160 or 185 is connected to the processor 155 or 180, such that it can store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present invention may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Firmware or software implemented in the present invention may be contained in the processor 155 or 180 or the memory unit 160 or 185, such that it can be driven by the processor 155 or 180.

Radio interface protocol layers among the reception end 110, the transmission end 105, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The reception end 110 and the transmission end 105 may exchange RRC messages with each other through the wireless communication network and the RRC layer. For example, the transmission end 105 may be a base station (BS), and the reception end 110 may be a UE or a relay node (RN). If necessary, the reception end 110 may operate as the BS, and the transmission end 105 may operate as a UE or RN.

Figure 2:
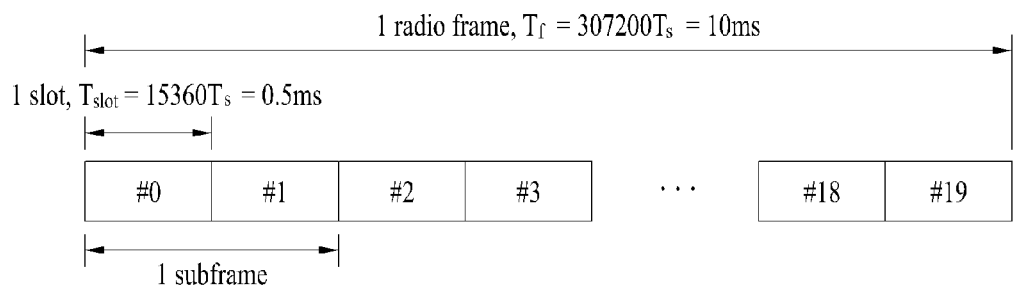
FIG. 2 is a diagram illustrating a structure of a radio frame used in a 3GPP LTE system as an exemplary mobile communication system.

FIG. 2 is a diagram illustrating a structure of a radio frame used in a 3GPP LTE system acting as a mobile communication system.

Referring to FIG. 2, the radio frame has a length of 10 ms (327200*$T_s$) and includes 10 subframes of equal size. Each subframe has a length 1 ms and includes two slots. Each slot has a length of 0.5 ms (15360×$T_s$). In this case, $T_s$ represents a sampling time, and is expressed by '$T_s$=1/(15 kHz*2048) =3.2552×10$^{-8}$ (about 33 ns)'. The slot includes a plurality of OFDM or SC-FDMA symbols in a time domain, and includes a plurality of resource blocks (RBs) in a frequency domain.

In the LTE system, one resource block includes twelve (12) subcarriers*seven (or six) OFDM (Orthogonal Frequency Division Multiplexing) symbols. A Transmission Time Interval (TTI) which is a transmission unit time of data can be determined in a unit of one or more subframes. The aforementioned structure of the radio frame is only exemplary, and various modifications can be made to the number of subframes contained in the radio frame or the number of slots contained in each subframe, or the number of OFDM or SC-FDMA symbols in each slot.

FIG. 3 is an exemplary structural diagram illustrating downlink and uplink subframes for use in a 3GPP LTE system as an exemplary mobile communication system according to the present invention.

Referring to FIG. 3(a), one downlink subframe includes two slots in a time domain. A maximum of three OFDM symbols located in the front of the downlink subframe are used as a control region to which control channels are allocated, and the remaining OFDM symbols are used as a data region to which a Physical Downlink Shared Channel (PDSCH) channel is allocated.

DL control channel for use in the 3GPP LTE system includes a Physical Control Format Indicator CHannel (PCFICH), a Physical Downlink Control Channel (PDCCH), a Physical Hybrid-ARQ Indicator CHannel (PHICH), and the like. The traffic channel includes a Physical Downlink Shared CHannel (PDSCH). PCFICH transmitted through a first OFDM symbol of the subframe may carry information about the number of OFDM symbols (i.e., the size of control region) used for transmission of control channels within the subframe. Control information transmitted through PDCCH is referred to as downlink control information (DCI). The DCI may indicate UL resource allocation information, DL resource allocation information, UL transmission power control commands of arbitrary UE groups, etc. PHICH may carry ACK (Acknowledgement)/NACK (Not-Acknowledgement) signals about an UL Hybrid Automatic Repeat Request (UL HARQ). That is, the ACK/NACK signals about UL data transmitted from the UE are transmitted over PHICH.

PDCCH serving as a downlink physical channel will hereinafter be described in detail.

A base station (BS) may transmit information about resource allocation and transmission format (UL grant) of the PDSCH, resource allocation information of the PUSCH, information about Voice over Internet Protocol (VoIP) activation, etc. A plurality of PDCCHs may be transmitted within the control region, and the UE may monitor the PDCCHs. Each PFCCH includes an aggregate of one or more contiguous control channel elements (CCEs). The PDCCH composed of the aggregate of one or more contiguous CCEs may be transmitted through the control region after performing subblock interleaving. CCE is a logical allocation unit for providing a coding rate based on a Radio frequency (RF) channel status to the PDCCH. CCE may correspond to a plurality of resource element groups. PDCCH format and the number of available PDCCHs may be determined according to the relationship between the number of CCEs and the coding rate provided by CCEs.

Control information transmitted over PDCCH is referred to as downlink control information (DCI). The following Table 1 shows DCIs in response to DCI formats.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

In Table 1, DCI format 0 may indicate uplink resource allocation information. DCI format 1 and DCI format 2 may indicate downlink resource allocation information. DCI format 3 and DCI format 3A may indicate uplink transmit power control (TPC) commands for arbitrary UE groups.

A method for allowing a BS to perform resource mapping for PDCCH transmission in the LTE system will hereinafter be described in detail.

Generally, the BS may transmit scheduling allocation information and other control information to the UE over the PDCCH. A physical control channel (PDCCH) is configured in the form of one aggregate (one aggregation) or several CCEs, and is transmitted as one aggregate or several CCEs. One CCE includes 9 resource element groups (REGs). The number of RBGs unallocated to either Physical Control Format Indicator Channel (PCFICH) or Physical Hybrid Automatic Repeat Request Indicator Channel (PHICH) is $N_{RBG}$. CCEs from 0 to $N_{CCE}-1$ may be available to a system (where, $N_{CCE} = \lfloor N_{REG}/9 \rfloor$). PDCCH supports multiple formats as shown in the following Table 2. One PDCCH composed of n contiguous CCEs begins with a CCE having 'i mod n=0' (where 'i' is a CCE number). Multiple PDCCHs may be transmitted through one subframe.

TABLE 2

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Referring to Table 2, an eNode B (eNB) may decide a PDCCH format according to how many regions are required for the BS to transmit control information. The UE reads control information and the like in units of a CCE, resulting in reduction of overhead. Likewise, a relay node (RN) may read control information or the like in units of R-CCE or CCE. In the LTE-A system, a resource element (RC) may be mapped in units of a Relay Control Channel Element (R-CCE) or CCE so as to transmit an R-PDCCH for an arbitrary RN.

Referring to FIG. 3(b), an uplink (UL) subframe may be divided into a control region and a data region in a frequency domain. The control region may be assigned to a Physical Uplink Control Channel (PUCCH) carrying uplink control information (UCI). The data region may be assigned to a Physical Uplink Shared Channel (PUSCH) carrying user data. In order to maintain single carrier characteristics, one UE does not simultaneously transmit PUCCH and PUSCH. PUCCH for one UE may be assigned to a Resource Block (RB) pair in one subframe. RBs of the RB pair occupy different subcarriers in two slots. The RB pair assigned to PUCCH performs frequency hopping at a slot boundary.

Figure 4:
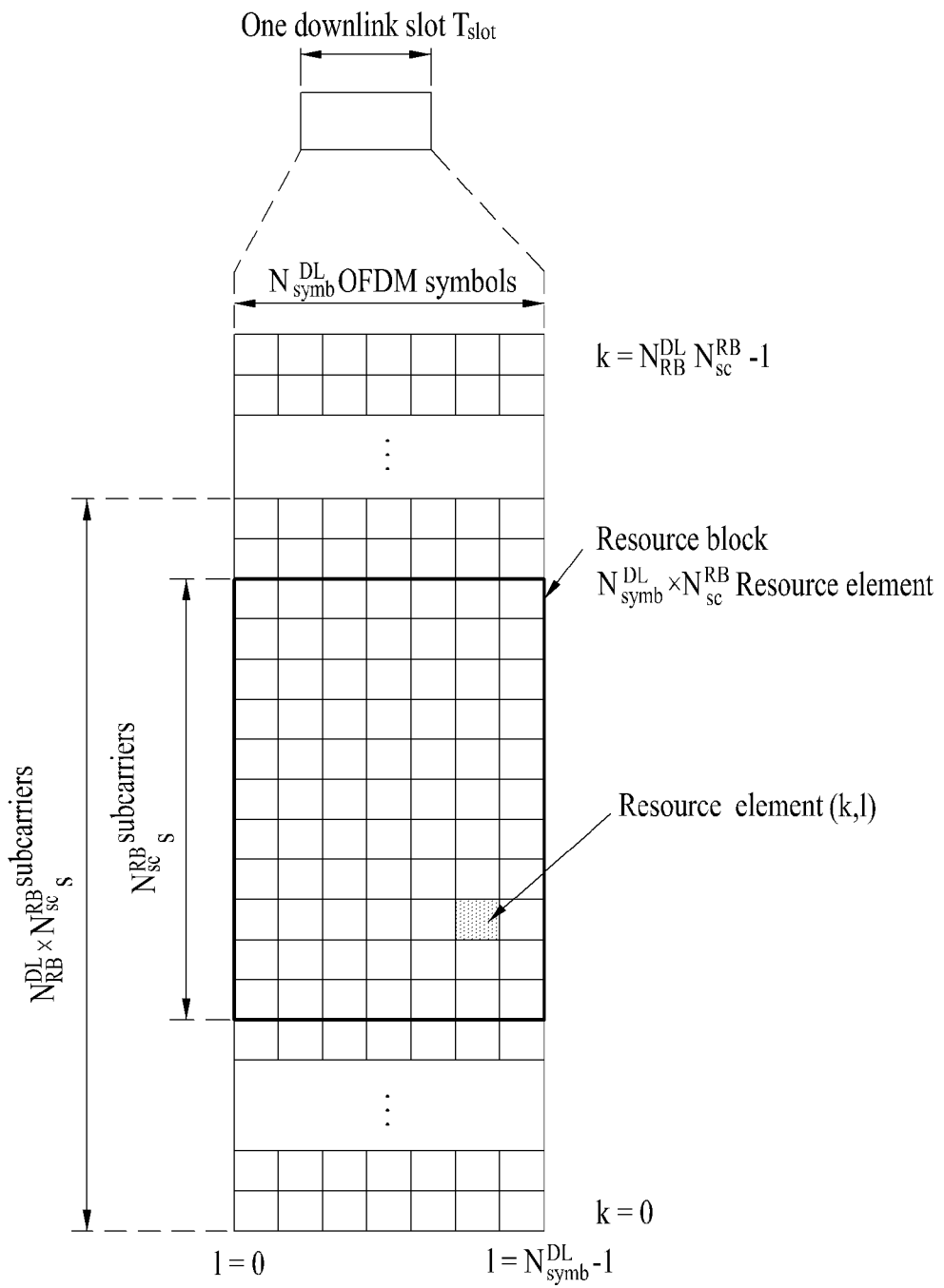
FIG. 4 shows a downlink (DL) time-frequency resource grid structure for use in a 3GPP LTE system.

FIG. 4 shows a downlink (DL) time-frequency resource grid structure for use in a 3GPP LTE system.

Referring to FIG. 4, downlink transmission resources can be described by a resource grid including $N_{RB}^{DL} \times N_{SC}^{RB}$ subcarriers and $N_{symb}^{DL}$ OFDM symbols. Here, $N_{RB}^{DL}$ represents the number of resource blocks (RBs) in a downlink, $N_{SC}^{RB}$ represents the number of subcarriers constituting one RB, and $N_{symb}^{DL}$ represents the number of OFDM symbols in one downlink slot. $N_{RB}^{DL}$ varies with a downlink transmission bandwidth constructed in a cell, and must satisfy $N_{RB}^{min,DL} \leq N_{RB}^{DL} \leq N_{RB}^{max,DL}$. Here, $N_{RB}^{min,DL}$ is the smallest downlink bandwidth supported by the wireless communication system, and $N_{RB}^{max,DL}$ is the largest downlink bandwidth supported by the wireless communication system. Although $N_{RB}^{min,DL}$ may be set to 6 ($N_{RB}^{min,DL}=6$) and $N_{RB}^{max,DL}$ may be set to 110 ($N_{RB}^{max,DL}=110$), the scopes of $N_{RB}^{min,UL}$ and $N_{RB}^{max,UL}$ are not limited thereto. The number of OFDM symbols contained in one slot may be differently defined according to the length of a Cyclic Prefix (CP) and spacing between subcarriers. When transmitting data or information via multiple antennas, one resource grid may be defined for each antenna port.

Each element contained in the resource grid for each antenna port is called a resource element (RE), and can be identified by an index pair (k,l) contained in a slot, where k is an index in a frequency domain and is set to any one of 0, . . . , $N_{RB}^{DL}N_{sc}^{RB}-1$, and l is an index in a time domain and is set to any one of 0, . . . , $N_{symb}^{DL}-1$.

Resource blocks (RBs) shown in FIG. 4 are used to describe a mapping relationship between certain physical channels and resource elements (REs). The RBs can be classified into physical resource blocks (PRBs) and virtual resource blocks (VRBs). One PRB is defined by $N_{symb}^{DL}$ consecutive OFDM symbols in a time domain and $N_{sc}^{RB}$ consecutive subcarriers in a frequency domain $N_{symb}^{DL}$ and $N_{sc}^{RB}$ may be predetermined values, respectively. For example, $N_{symb}^{DL}$ and $N_{sc}^{RB}$ may be given as shown in the following Table 1. Therefore, one PRB may be composed of $N_{symb}^{DL} \times N_{sc}^{RB}$ resource elements. One PRB may correspond to one slot in a time domain and may also correspond to 180 kHz in a frequency domain, but it should be noted that the scope of the present invention is not limited thereto.

TABLE 3

| Configuration | | $N_{sc}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

The PRBs are assigned numbers from 0 to $N_{RB}^{DL}-1$ in the frequency domain. The VRB may have the same size as that of the PRB. The VRB may be classified into a localized VRB (LVRB) and a distributed VRB (DVRB). For each VRB type, a pair of PRBs allocated over two slots of one subframe is assigned a single VRB number $n_{VRB}$.

The VRB may have the same size as that of the PRB. Two types of VRBs are defined, the first one being a localized VRB (LVRB) and the second one being a distributed type (DVRB). For each VRB type, a pair of PRBs may have a single VRB index (which may hereinafter be referred to as a 'VRB number') and are allocated over two slots of one subframe. In other words, $N_{RB}^{DL}$ VRBs belonging to a first one of two slots constituting one subframe are each assigned any one index of 0 to $N_{RB}^{DL}-1$, and $N_{RB}^{DL}$ VRBs belonging to a second one of the two slots are likewise each assigned any one index of 0 to $N_{RB}^{DL}-1$.

The radio frame structure, the downlink subframe, the uplink subframe, and the downlink time-frequency resource grid structure shown in FIGS. 2 to 4 may also be applied between a base station (BS) and a relay node (RN).

A method for allowing the BS to transmit a PDCCH to a user equipment (UE) in an LTE system will hereinafter be described in detail. The BS determines a PDCCH format according to a DCI to be sent to the UE, and attaches a Cyclic Redundancy Check (CRC) to control information. A unique identifier (e.g., a Radio Network Temporary Identifier (RNTI)) is masked onto the CRC according to PDCCH owners or utilities. In case of a PDCCH for a specific UE, a unique ID of a user equipment (UE), for example, C-RNTI (Cell-RNTI) may be masked onto CRC. Alternatively, in case of a PDCCH for a paging message, a paging indication ID (for example, R-RNTI (Paging-RNTI)) may be masked onto CRC. In case of a PDCCH for system information (SI), a system information ID (i.e., SI-RNTI) may be masked onto CRC. In order to indicate a random access response acting as a response to an UE's random access preamble transmission, RA-RNTI (Random Access-RNTI) may be masked onto CRC. The following Table 4 shows examples of IDs masked onto PDCCH and/or R-PDCCH.

TABLE 4

| Type | Identifier | Description |
|---|---|---|
| UE-specific | C-RNTI | used for the UE corresponding to the C-RNTI. |
| Common | P-RNTI | used for paging message. |
| | SI-RNTI | used for system information (It could be differentiated according to the type of system information). |
| | RA-RNTI | used for random access response (It could be differentiated according to subframe or PRACH slot index for UE PRACH transmission). |
| | TPC-RNTI | used for uplink transmit power control command (It could be differentiated according to the index of UE TPC group). |

If C-RNTI is used, PDCCH may carry control information for a specific UE, and R-PDCCH may carrier control information for a specific RN. If another RNTI is used, PDCCH may carry common control information that is received by all or some UEs contained in the cell, and R-PDCCH may carry common control information that is received by all or some RNs contained in the cell. The BS performs channel coding of the CRC-added DCI so as to generate coded data. The BS performs rate matching according to the number of CCEs allocated to a PDCCH or R-PDCCH format. Thereafter, the BS modulates the coded data so as to generate modulated symbols. In addition, the BS maps the modulated symbols to physical resource elements.

The embodiment of the present invention proposes a method for applying th spatial multiplexing scheme to a control channel (for example, Advanced PDCCH (A-PDCCH), Enhanced PDCCH, ePDCCH, etc.) obtained by improvement of a PDCCH channel serving as a control channel of the legacy 3GPP LTE system. In addition, the spatial multiplexing scheme applied to the improved control channel may be equally applied to a Relay-Physical Downlink Control Channel (R-PDCCH) of the 3GPP LTE-A system unless otherwise mentioned. Here, R-PDCCH may be referred to as a backhaul physical downlink control channel for relay transmission from the BS to the RN, and is used as a control channel for the RN.

Figure 5:
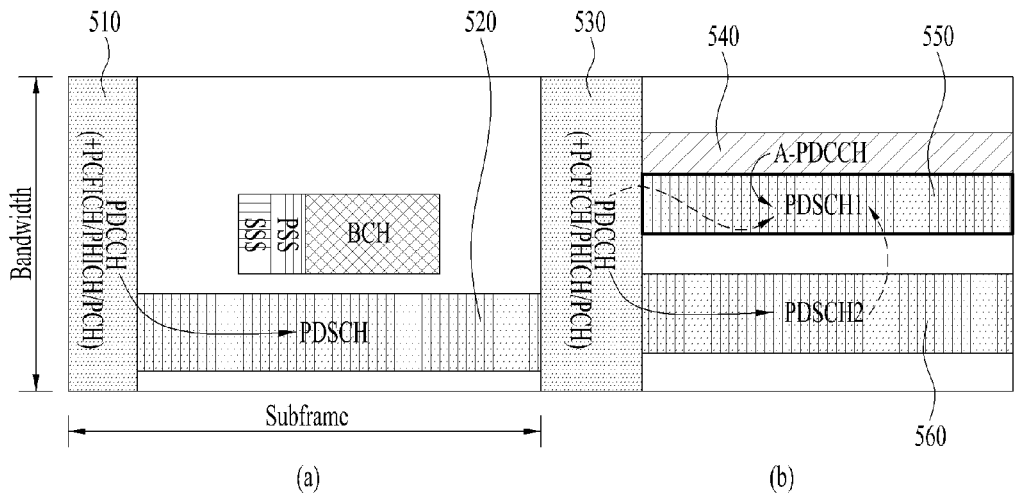
FIG. 5 is a conceptual diagram illustrating a legacy PDCCH concept and an A-PDCCH scheme proposed by the embodiment.

FIG. 5 is a conceptual diagram illustrating a legacy PDCCH concept and an A-PDCCH scheme proposed by the embodiment.

Referring to FIG. 5(a), a PDCCH region 510 is allocated to one subframe, and downlink control information (for example, DL grant, UL grant, etc.) received from the PDCCH region 510 relates to a PDSCH 520 contained in the same subframe. The processor 155 of the UE may decode a PDSCH region 520 on the basis of DL control information received from the PDCCH 510 so as to acquire data.

Referring to FIG. 5(b), A-PDCCH 540 may be allocated to the PDSCH region serving as a data reception region in the legacy LTE system. A-PDCCH 540 may carry DL scheduling assignment information for PDSCH 1 (550) and a Physical Uplink Shared CHannel (PUSCH) UL scheduling grant. Generally, when a PDCCH 530 is not received, the A-PDCCH 540 may be transmitted on the basis of a UE-specific reference signal.

The UE may simultaneously receive the A-PDCCH 540 and the PDCCH 530, and may decode PDSCH 1 (550) upon receiving additional assistance from the PDCCH 530. Referring to FIG. 5(*b*), the A-PDCCH 540 may be FDM-processed along with PDSCH 1 (550) and PDSCH 2 (560) within a data region of the legacy LTE system.

In order to obtain beamforming gain, the BS may apply precoding to a DM RS (DeModulation Reference Signal)—based A-PDCCH 540. The UE may decode the A-PDCCH on the basis of a DM RS. In this case, a reference signal (RS) for use in the LTE-A system will hereinafter be described in detail.

One important consideration in designing an LTE-A system is backward compatibility. Backward compatibility is the ability to support existing LTE UEs such that the LTE UEs properly operate in the LTE-A system. If RSs for up to 8 transmit antennas are added to time-frequency domains in which a CRS defined in the LTE standard is transmitted every subframe over an entire band, RS overhead is excessively increased from the viewpoint of RS transmission. That is, assuming that RS patterns for up to 8 Tx antennas are added to each subframe of the entire band in the same manner as in CRS of legacy LTE, RS overhead excessively increases. Therefore, there is a need to take into consideration RS overhead reduction when designing new RSs for up to 8 antenna ports. RSs newly introduced in the LTE-A system may be largely classified into two types. One is a DeModulation RS (DM RS) which is an RS for demodulating data transmitted through up to 8 transmit antennas. The other is a Channel State Information RS (CSI-RS) which is an RS for channel measurement for selection of a Modulation and Coding Scheme (MCS), a Precoding Matrix Index (PMI), or the like. The CSI-RS for channel measurement is characterized in that the CSI-RS is designed mainly for channel measurement unlike the CRS of the conventional LTE system which is used not only for measurement of handover or the like but also for data modulation. Of course, the CSI-RS may also be used for measurement of handover or the like. Since the CSI-RS is transmitted only for the purpose of obtaining information regarding channel conditions, the CSI-RS need not be transmitted every subframe, unlike the CRS of the conventional LTE system. Accordingly, to reduce CSI-RS overhead, the CSI-RS may be designed to perform transmission intermittently (periodically) in the time domain. For data demodulation, DM-RS is transmitted to a UE scheduled in the corresponding time-frequency domain. That is, DM-RS of a specific UE is transmitted only to a scheduled region (i.e., a time-frequency region for data reception) of the corresponding UE.

Meanwhile, the present invention provides a solution method of the problems encountered when an A-PDCCH Search Space (e.g., RS RE) is overlapped with a synchronization channel or a Physical Broadcast Channel (PBCH).

As described above, FIG. 5 is a conceptual diagram illustrating a method for employing physical layer (PHY) or higher layer information transferred through a legacy PDCCH and PDSCH2 during transmission of A-PDCCH—based PDSCH1.

Of course, if a subject of FIG. 5 is a user equipment (UE), the UE may receive all or some parts of a plurality of channels, for example, a Primary Synchronization Signal (PSS), a Secondary Synchronization Signal (SSS), a Broadcast Channel (BCH), a Physical Control Format Indicator Channel (PCFICH), a Physical Hybrid ARQ Indicator Channel (PHICH), a Paging Channel (PCH), etc.

On the contrary, according to LTE technology, a set of restricted CCE locations at which PDCCH will be located may be used for each UE. In this case, the set of CCE locations at which the UE will search for a PDCCH thereof may be considered a search space. In LTE, the search space may have different sizes for respective PDCCH formats.

In addition, the separate dedicated search space and the common search space may be defined separately from each other. In this case, the separate dedicated search space is configured independently from each UE, and all UEs may recognize the extent of a common search space.

In general, the A-PDCCH search space may be semi-statically configured by RRC signaling (without excluding dynamic configuration). Therefore, there may arise configuration restriction problems in which a search space (specifically, DM RS based A-PDCCH) must be configured while simultaneously avoiding BCH, PSS, and SSS signals periodically (e.g., at intervals of several milliseconds) transmitted according to a predetermined pattern.

Figure 6:
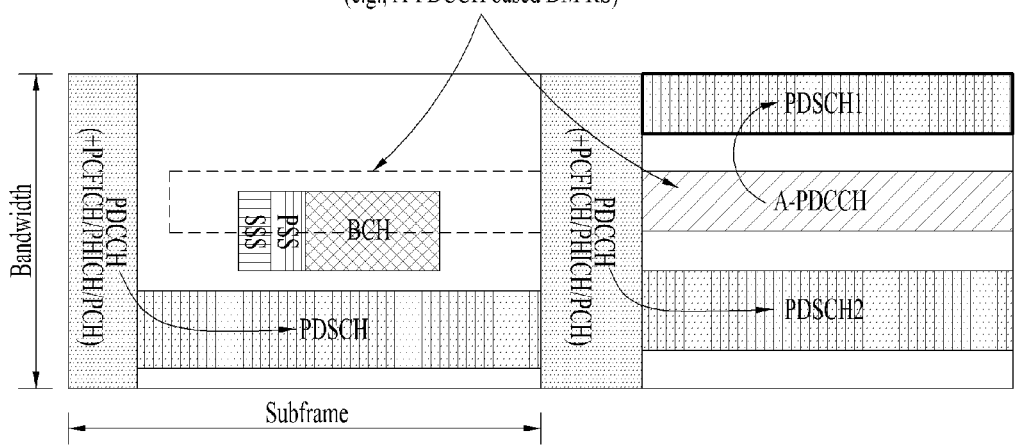
FIG. 6 shows an example of collision between PBCH/PSS/SSS and R-PDCCH Search Space based on DM-RS according to an embodiment.

FIG. 6 shows an example of collision between PBCH (Physical Broadcast Channel)/PSS/SSS and R-PDCCH Search Space based on DM-RS according to an embodiment.

Referring to FIG. 6, since SSS is located at the sixth OFDM symbol, the SSS may collide with a DM RS RE (located at $5^{th}$ and $6^{th}$ symbols) of a first slot. In case of using the CRS based A-PDCCH, there may arise collision in a Physical Broadcast Channel (PBCH) sent to a second slot.

Since A-PDCCH decoding failure may occur in a resource region overlapping situation between resources used by respective channels, the present invention proposes the following methods.

First Embodiment

Although the semi-static A-PDCCH search space is configured, the eNB may not transmit A-PDCCH(s) at a subframe (e.g., Subframes #0 and #5) where a problematic channel is transmitted. In this case, if A-PDCCH is not detected, the UE may assume non-transmission of the A-PDCCH.

In accordance with another method for solving the above problems, a method for preventing transmission of A-PDCCH and associated PDSCH at the problematic subframe (e.g., Subframes #0 and #5) may be used.

In accordance with another method for solving the above problems, a method for transmitting A-PDCCH(s) at a subframe prior to the problematic subframe may be used as necessary.

For example, a method for performing pre-scheduling at Subframes #9 and #4 may be used.

Second Embodiment

In accordance with another method for solving the above-mentioned problems, a method for transmitting A-PDCCH (a) only in the remaining regions other than the overlapped region from among the A-PDCCH search space may be used as necessary.

That is, a VRB set configured by RRC signaling may be equally maintained in contiguous subframes. Although A-PDCCH CCEs are successively allocated to contiguous subframes, the VRB-to-PRB mapping process is performed by skipping the overlapped region.

FIG. 7 is a conceptual diagram illustrating a method for performing modified VRB-to-PRB mapping considering a plurality of overlapped RBs according to an embodiment.

Referring to FIG. 7, the VRB-to-PRB mapping rule may use Resource Allocation (RA) Type 0, Resource Allocation (RA) Type 1, and Resource Allocation (RA) Type 2. If necessary, the modified rule may be used.

In accordance with another example, after the remaining search space PRBs other than PRBs belonging to the overlapped region from among a PRB search space are newly indexed, a method for using the legacy mapping rule may be used.

In this case, the UE may recognize the overlapped region and the search space configuration, such that the UE may avoid unnecessary blind decoding in the overlapped region.

Third Embodiment

Meanwhile, in accordance with another method for solving the above-mentioned problem, a method for mapping the A-PDCCH to be actually transmitted on the VRB index in consideration of the overlapped region may be used as necessary.

FIG. 8 is a conceptual diagram illustrating a VRB set configuration considering an overlapped region according to an embodiment.

That is, referring to FIG. 8, assuming that the above-mentioned method is designed in a manner that a VRB with "X" is scheduled to be mapped to the overlapped region, the above-mentioned method skips the VRB with "X" and maps the R-PDCCH CCE to VRBs #3 and #4.

In another implementation example, the VRB index to be mapped to the overlapped PRB is recognized and the recognized VRB index may be used as a null PRB.

That is, A-PDCCH is not allocated to the null PRB, and the A-PDCCH may be allocated only to the remaining available VRBs. In this case, the UE may recognize the overlapped region, and the search space configuration can also be recognized, such that unnecessary blind decoding can be avoided in the overlapped region.

Fourth Embodiment

Figure 9:
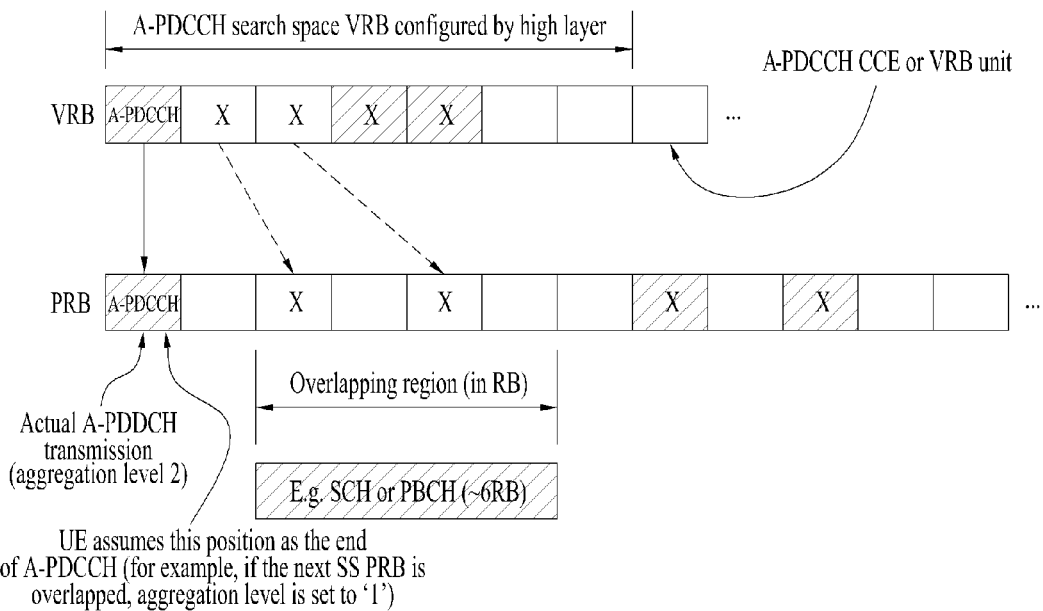
FIG. 9 is a conceptual diagram illustrating actual A-PDCCH mapping ends located before a plurality of overlapping RBs according to an embodiment.

Meanwhile, as another method for solving the above-mentioned problems, a method for enabling a UE and an eNB to perform the following rules so as to prevent unnecessary blind decoding of the UE may be used, and a detailed description thereof will be described in FIG. 9.

First, if the UE meets the overlapped region while simultaneously performing blind decoding in a designated search space, it may be considered that the A-PDCCH has been transmitted only to the search space configured before the overlapped RB.

In this case, the eNB may follow the rule in which the A-PDCCH is not mapped to the overlapped region.

Through the above actions, the CCE aggregation level may be implicitly transferred to the UE, and at the same time the UE may avoid an unnecessary blind decoding trial in the overlapped region.

In addition, the UE assumes that the A-PDCCH mapping is skipped over the overlapped region, and performs blind decoding based on the assumption. The above UE assumption is shown in FIG. 10.

Figure 10:
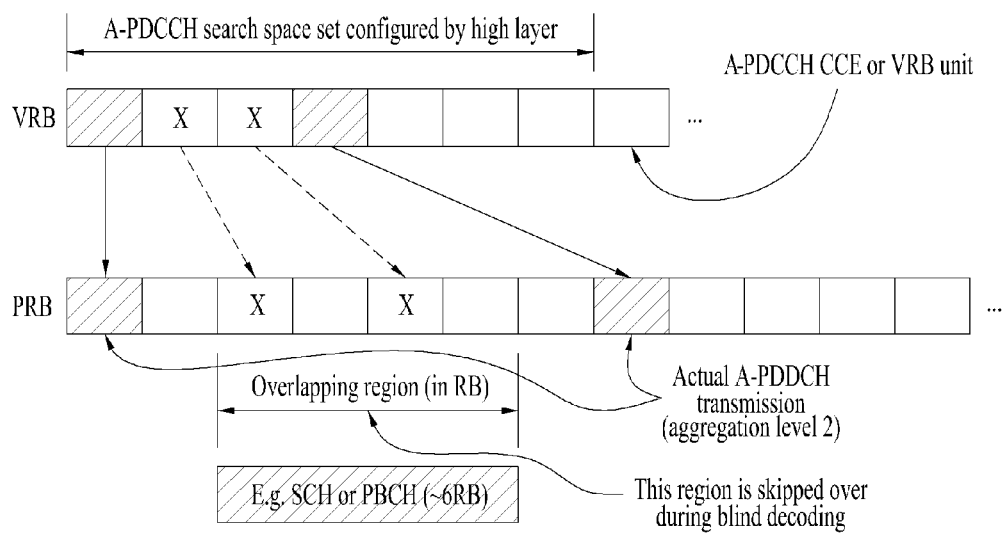
FIG. 10 is a conceptual diagram illustrating a method for enabling a user equipment (UE) to skip blind decoding during overlapping region.

Referring to FIG. 10, the UE may avoid the unnecessary blind decoding trial in the overlapped region. In the case of using the above technology, the present invention must be implemented in a different way from the legacy UE, and the eNB transmission operation may be changed to another.

Fifth Embodiment

Figure 11:
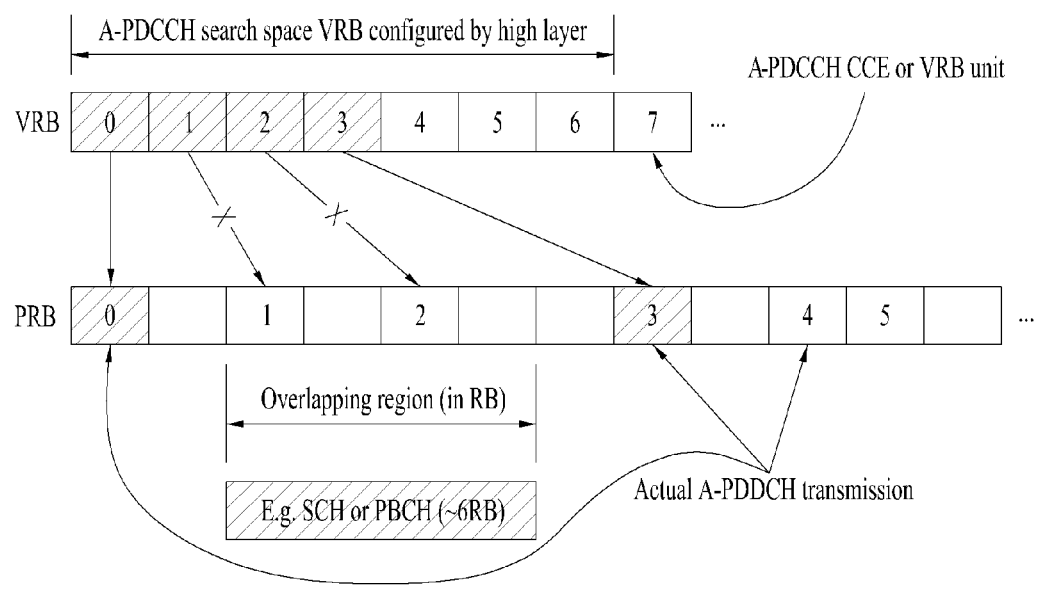
FIG. 11 is a conceptual diagram illustrating an application example of a reduced CCE aggregation level in response to overlapping region(s).

Another method for solving the above-mentioned problem is shown in FIG. 11.

Referring to FIG. 11, although 4 CCE aggregations are configured at a VRB level, information or data is not transmitted in the overlapping region of the search space, resulting in 2 CCE aggregation levels. In this case, the UE must recognize that A-PDCCH will not be transmitted to the overlapping region.

In this case, a signal is transmitted at a level lower than the intended aggregation level, such that A-PDCCH decoding throughput may be deteriorated. Considering the above-mentioned problem, it is preferable that the eNB may increase the CCE aggregation level in consideration of the number of RBs excluded from the PRB.

Meanwhile, according to the above-mentioned embodiments, the VRB size may be different from the CCE size as necessary. Accordingly, the above-mentioned proposed methods may indicate not only the VRB-to-PRB mapping but also the CCE-to-VRB or CCE-to-PRB mapping.

In accordance with the above-mentioned embodiments, A-PDCCH or R-PDCCH decoding throughput may be improved at a reception end, and A-PDCCH or R-PDCCH may be transmitted by a transmission end according to the spatial multiplexing (SM) scheme, resulting in increase in resource use efficiency.

It will be appreciated by persons skilled in the art that the objects that can be achieved by the present invention are not limited to what has been particularly described hereinabove and the above and other objects that the present invention can achieve will be more clearly understood from the foregoing detailed description taken in conjunction with the accompanying drawings. The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicitly cited relation in the appended claims or may include new claims by amendment after the application is filed.

It will be apparent to those skilled in the art that various modifications and variations can be made in the present invention without departing from the spirit or scope of the invention. Therefore, the above-mentioned detailed description must be considered for illustrative purposes only, not restrictive purposes. The scope of the present invention must be decided by a rational analysis of the claims, and all modifications within equivalent ranges of the present invention are within the scope of the present invention.

INDUSTRIAL APPLICABILITY

As is apparent from the above description, a method for transmitting a signal using a plurality of antenna ports and a transmission end for the same according to the embodiments of the present invention can be applied to various mobile communication systems, for example, 3GPP LTE, LTE-A, IEEE 802, and the like.

The invention claimed is:

1. A method for receiving a signal by a terminal in a wireless communication system, the method comprising:
   receiving, from a base station (BS), configuration information for a first channel; and
   monitoring the first channel in a first resource region of a plurality of resource regions within a data region of a subframe according to the configuration information,
   wherein the first channel is an Advanced-Physical Downlink Control Channel (A-PDCCH),
   wherein the first resource region is a resource region within the data region of the subframe which does not overlap a second resource region within the data region of the subframe, the second resource region being used by the BS for transmitting a second channel to the terminal, and
   wherein the second channel is periodically transmitted.

2. The method according to claim 1, wherein the second channel includes at least one of a Primary Synchronization Signal (PSS), a Secondary Synchronization Signal (SSS), and a Physical Broadcast Channel (PBCH).

3. The method according to claim 1, wherein the configuration information is transmitted through RRC (radio resource control) signaling, MAC (medium access control) signaling, or physical (PHY) layer signaling.

4. The method according to claim 1, wherein each of the plurality of resource regions corresponds to a resource block (RB).

5. The method according to claim 1, wherein the BS is an evolved Node B (eNodeB) and the terminal is a user equipment (UE) or relay node (RN).

6. The method according to claim 1, further comprising: receiving the first channel as a result of the monitoring.

7. A terminal configured to receive a signal in a wireless communication system, the method comprising:
   a reception module configured to receive, from a base station (BS), configuration information for a first channel; and
   a processor configured to monitor the first channel in a first resource region of a plurality of resource regions within a data region of a subframe according to the configuration information,
   wherein the first channel is an Advanced-Physical Downlink Control Channel (A-PDCCH),
   wherein the first resource region is a resource region within the data region of the subframe which does not overlap a second resource region within the data region of the subframe, the second resource region being used by the BS for transmitting a second channel to the terminal, and
   wherein the second channel is periodically transmitted.

8. The terminal according to claim 7, wherein the second channel includes at least one of a Primary Synchronization Signal (PSS), a Secondary Synchronization Signal (SSS), and a Physical Broadcast Channel (PBCH).

9. The terminal according to claim 7, wherein the configuration information is transmitted through RRC (radio resource control) signaling, MAC (medium access control) signaling, or physical (PHY) layer signaling.

10. The terminal according to claim 7, wherein each of the plurality of resource regions corresponds to a resource block (RB).

11. The terminal according to claim 7, wherein the BS is an evolved Node B (eNodeB) and the terminal is a user equipment (UE) or relay node (RN).

12. The terminal according to claim 7, wherein the processor is further configured to receive the first channel as a result of the monitoring.

* * * * *